United States Patent [19]

Kameyama

[11] Patent Number: 5,105,211
[45] Date of Patent: Apr. 14, 1992

[54] FILM LOADING APPARATUS FOR A CAMERA

[75] Inventor: Nobuyuki Kameyama, Tokyo, Japan

[73] Assignee: Fuji Photo Film Co., Ltd., Kanagawa, Japan

[21] Appl. No.: 600,820

[22] Filed: Oct. 22, 1990

[30] Foreign Application Priority Data

Oct. 20, 1989 [JP] Japan .................................. 1-273470

[51] Int. Cl.⁵ .............................................. G03B 1/12
[52] U.S. Cl. .................... 354/173.1; 354/174; 354/212
[58] Field of Search ................... 354/173.1, 174, 212

[56] References Cited

FOREIGN PATENT DOCUMENTS 62-26745  7/1987  Japan .
62-62330  12/1987  Japan .
62-62331  12/1987  Japan .

Primary Examiner—Michael L. Gellner
Attorney, Agent, or Firm—Young & Thompson

[57] ABSTRACT

A camera having a camera body has a film loading apparatus that includes a film rewinding shaft disposed upright within the camera body. When a film cassette is inserted into the camera body, it is cradled in a cassette holder than swings vertically between an inclined open position and a closed upright position. When the cassette holder has been swung wholly within the camera body, the film rewinding shaft is fitted in a lower end of a spool of a film cassette held in the cassette holder.

10 Claims, 7 Drawing Sheets

FIG. 12
(PRIOR ART)
FIG. 13
(PRIOR ART)
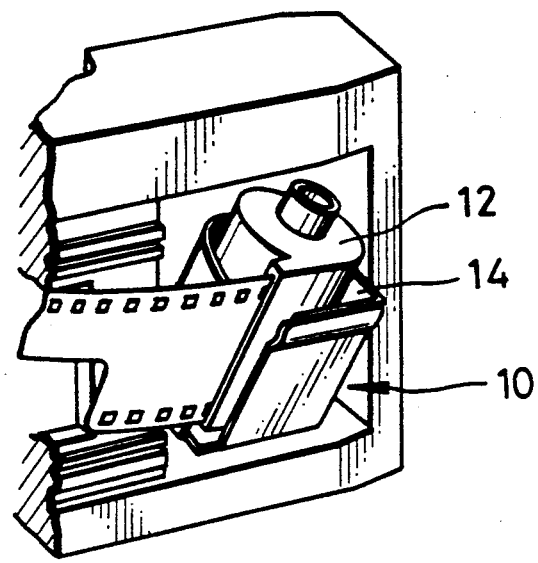
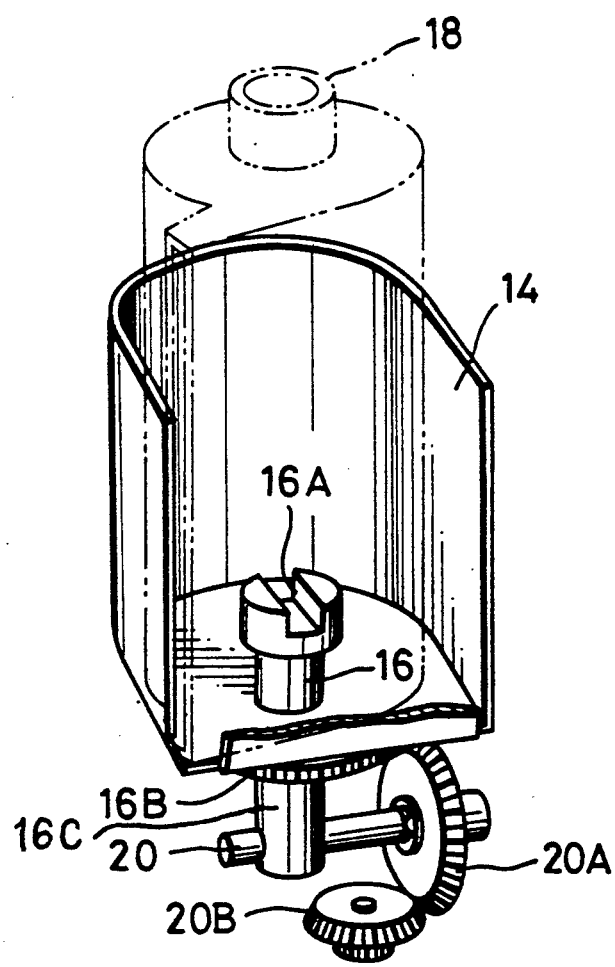

FILM LOADING APPARATUS FOR A CAMERA

FIELD OF THE INVENTION

The present invention relates to a film loading apparatus for a camera, more particularly to an apparatus for loading a film cassette in a cassette holder which can be swung out from the rear side of the camera body.

BACKGROUND OF THE INVENTION

Film loading apparatus for a camera has been recently proposed, for more easily loading film in the camera, for example in Japanese Patent Publs. Nos. 62-62330 and 62-62331, and Japanese Utility Model Publ. No. 62-26745. As is seen in FIG. 12 of the accompanying drawings, illustrating such a known film loading apparatus, a film supply chamber 10 is provided with a cassette holder 14 which can be swung out to a predetermined extent from the rear side of the camera body for loading a film cassette 12. In FIG. 13, the cassette holder 14 is seen to be provided with a film rewinding shaft 16 which has a fork 16A at its end. A shaft 16C is coaxially connected to the lower end of the film rewinding shaft 16. A shaft 20 is inserted in the shaft 16C in the perpendicular direction. Shaft 16 can rotate relative to shaft 16C about their common axis. A bevel gear 16B is fixedly mounted on the film rewinding shaft 16, and engages with a bevel gear 20A rotatably supported by the shaft 20. The bevel gear 20A also engages with a bevel gear 20B driven by a driving source (not shown). When a film is loaded, the film cassette 12 is inserted in the cassette holder 14 by inclining it as is illustrated in FIG. 12, and the cassette holder 14 is returned to the loading position while being swung about the shaft 20 on shafts 16 and 16C. When the film is rewound, the bevel gear 20A is rotated about the shaft 20 by means of the bevel gear 20B, and transmits rotation to the bevel gear 16B. The bevel gear 16B rotates together with the film rewinding shaft 16 so as to reverse rotate the spool of the film cassette 12 and rewind the film after exposure. In this process, the shaft 16C does not rotate.

However, such a known film loading apparatus has the disadvantage of comprising a complicated structure requiring a large space, since the construction in which the film rewinding shaft 16 is fitted on the cassette holder 14 requires bevel gears interconnecting it with a film driving source of the camera.

OBJECT OF THE INVENTION

It is therefore an object of the present invention to provide a film loading apparatus of which the construction is simplified.

SUMMARY OF THE INVENTION

In order to achieve the above and other objects and advantages of this invention, a film rewinding shaft is disposed upright so as to be fitted in a spool of a film cassette when the film cassette held in a cassette holder is swung into the film supply chamber. In a preferred embodiment of the present invention, the film rewinding shaft is located on such a rotary locus of a spool end which lacks projection from the cassette casing that the spool is swung around a cassette holder shaft.

According to the present invention, the cassette holder is separate from the film drive mechanism such as a film rewinding shaft for rewinding the film, so that the structure can be made simple and compact.

BRIEF DESCRIPTION OF THE DRAWINGS

The above objects and advantages of the present invention will become more apparent from the following detailed description when read in connection with the accompanying drawings, in which:

FIG. 12, as previously stated, is a perspective view schematically illustrating a camera with a known film loading apparatus; and FIG. 13, as also previously stated, is a perspective view schematically illustrating the film loading apparatus illustrated in FIG. 12.

DETAILED DESCRIPTION OF THE PREFERRED EMBODIMENTS

Figure 1:
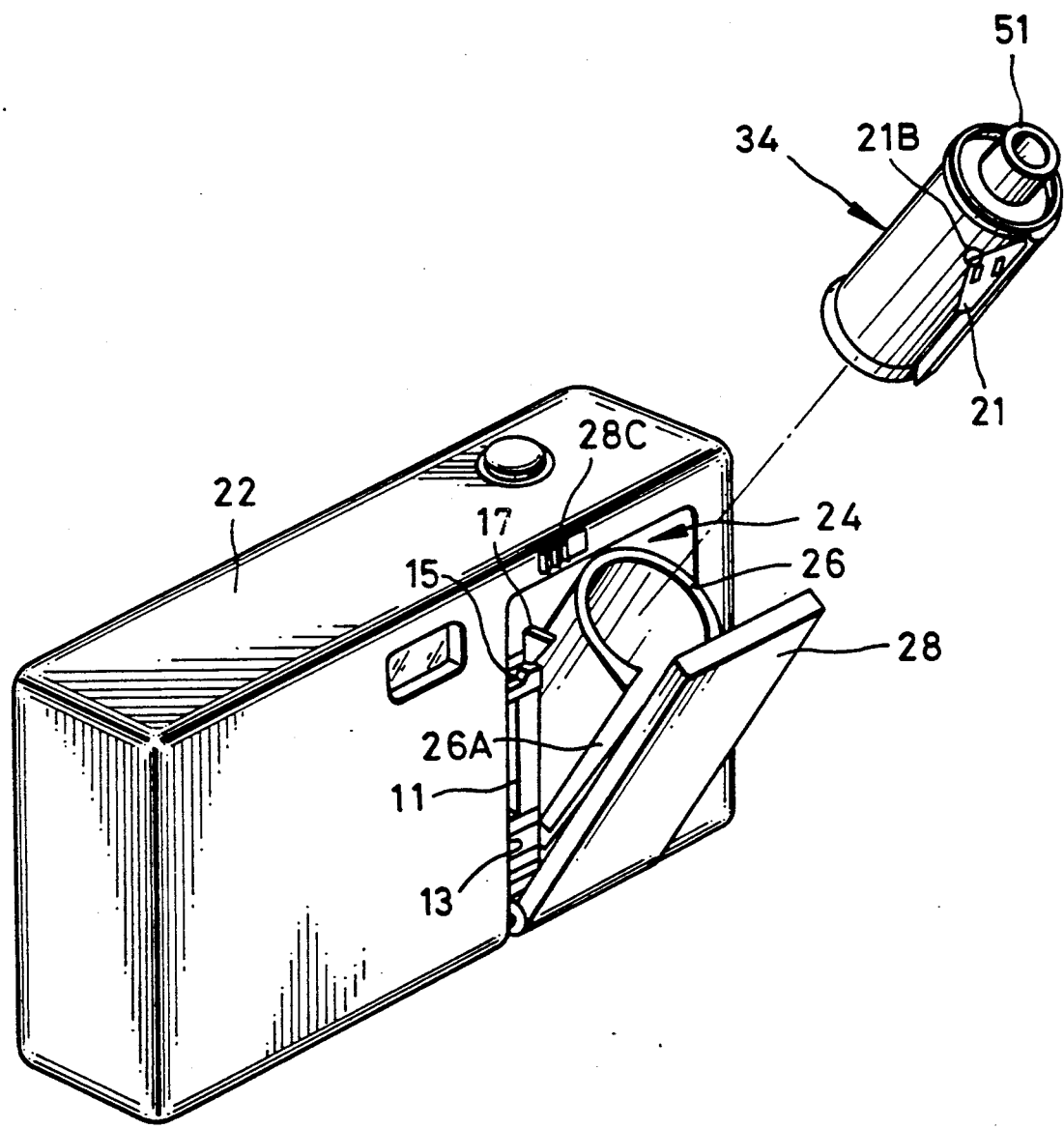
FIG. 1 is a perspective view schematically illustrating a camera provided with a film loading apparatus according to the present invention.

In FIG. 1, schematically illustrating a camera provided with a film loading apparatus embodying the present invention, a camera body 22 is provided with a film supply chamber 24 having a cassette holder 26 and a rear lid 28 which can together be swung over a predetermined range. A slot 26A is formed on the cassette holder 26 for the passage of film 54 (see FIG. 7). After a film leader 21 drawn from a film cassette 34 is positioned so as to pass through the slot 26A toward an aperture 11 of the camera, the film 54 is loaded by closing the rear lid 28. A film upper edge positioning member 17 is formed on the upper portion of the film supply chamber 24, and corrects the position of the film leader 21 when it is upwardly inclined, guiding an upper edge 21B of the film leader 21 to be parallel to the film feeding direction.

Reference numeral 13 represents a film passageway, which constitutes an extension of the slot 26A when the cassette holder 26 is in the closed position. Reference numeral 15 represents a one-toothed rotary disk engageable with the perforations on the film leader 21 of the film 54 for the preliminary film advance.

Figure 2:
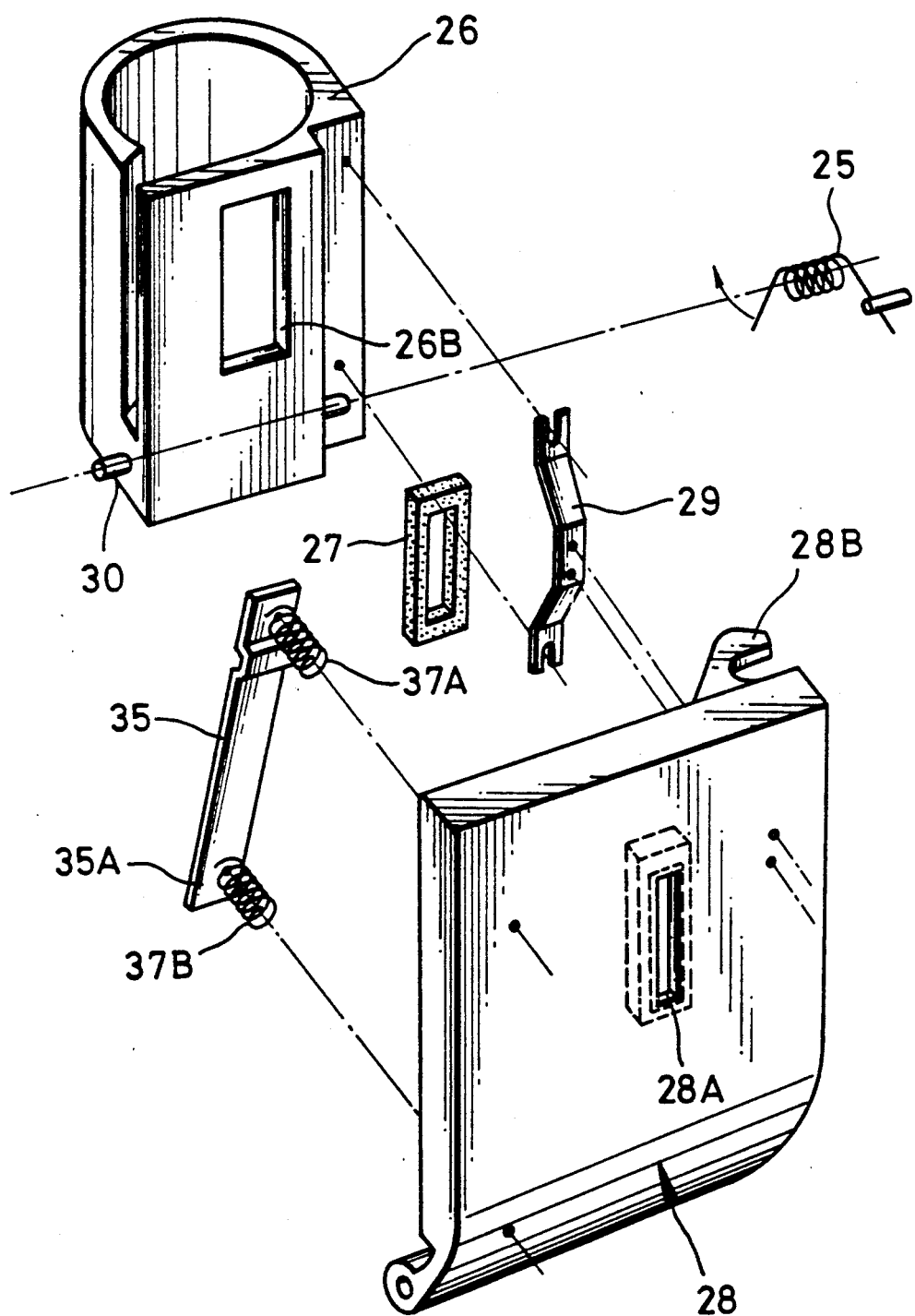
FIG. 2 is an exploded perspective view illustrating the relationship between the cassette holder and the rear lid.

In FIG. 2, a window 26B is shown on the rear of the cassette holder 26 for visual recognition of the film cassette in the camera.

Figure 3:
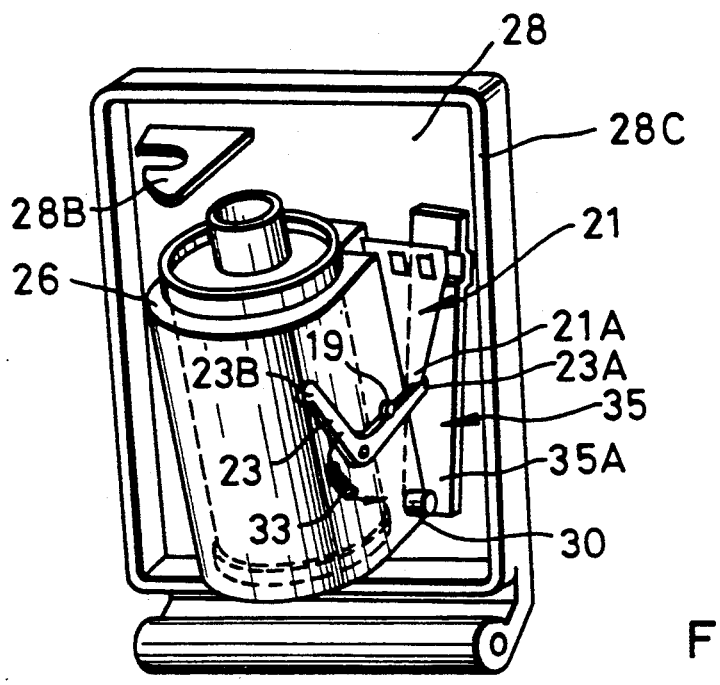
FIG. 3 is a perspective view of the cassette holder and the rear lid as viewed from inside the film supply chamber.

In FIGS. 2 and 3, the lower portion of the cassette holder 26 is shown to be provided with a shaft 30 disposed horizontally along the rear of the camera body 10 for swingably mounting the cassette holder 26 in the film supply chamber 24. The cassette holder 26 is biassed clockwise about the shaft 30, as seen in FIG. 2, by means of a spring 25.

A window 18A is formed in the rear lid 28 in correspondence with the window 26B, and has a light shielding member 27 as illustrated also by the broken line around the window 28A inside the rear lid 28. When the lid 28 is opened, the light shielding member 27 is swung out from within the window 26B to allow inserting the film cassette 34 smoothly. When the lid 28 is thereafter closed, the light shielding member 27 is again inserted through the window 26B so as light-tightly to contact the peripheral surface of the film cassette 34.

The lid 28 supports the cassette holder 26 through a leaf spring 29, which regulates the positional relation between the cassette holder 2 and the lid 28 when the lid 28 opens.

In FIG. 3, a light shielding rib 28C is formed on the perimeter of the inner side of the rear lid, and is adapted to be received in a light shielding groove (not shown) around the film supply chamber 24 when the lid 28 is closed, in order to prevent light from entering the film supply chamber 24. A shaft 36 below the rotary shaft 30, nearly at the bottom of the camera, mounts the lid for vertical swinging movement separately from the rotary shaft 30 of the cassette holder 26. This construction makes the light shielding mechanism simple, as the light shielding rib 28C of the lid 28 illustrated in FIG. 3 entirely surrounds the cassette holder 26.

As shown in FIG. 2, a pressure plate 35 is supported by the lid 28 through springs 37A and 37B. When the film is loaded, the pressure plate 35 presses against the film leader 21 as illustrated in FIG. 3, and makes it easy to engage the perforations of the film leader 21 with the one-toothed rotary disk 15. The springs 37A and 37B are formed such that a lower end 35A of the pressure plate 35 is urged toward the front side of the camera, thereby to incline the pressure plate 35 when the lid 28 is open, and to make it easy to pass the film leader 21 through the slot 26A.

A hook 28B is formed at the top of the inner side of lid 28, and is released from engagement with an arresting member (not shown) on the camera body 22 upon sliding a knob 28C (see FIG. 1), thereby to swing the lid 28 to the open position. As is illustrated in FIG. 3, a film tongue positioning member 23 is swingably mounted on the cassette holder 26, and is biassed counterclockwise by a spring 33. When the film 54 is loaded, the positioning member 23 guides a lower edge 21A of the film leader 21 to be parallel to the film feeding direction. When the lid 28 is opened, the positioning member 23 comes into contact with a stop 19, and is thus prevented from swinging counterclockwise farther than is necessary. When the lid 28 is closed, a rear end 23B of the positioning member 23 comes into contact with a projection 38 (see FIGS. 11A and 11B) in the film supply chamber 24 to swing the positioning member 23 clockwise so that a tip 23A thereof is retracted from the film passageway 13 passing through the slot 26A. The film advance thus cannot be obstructed when passing through the slit 26A.

Figure 4:
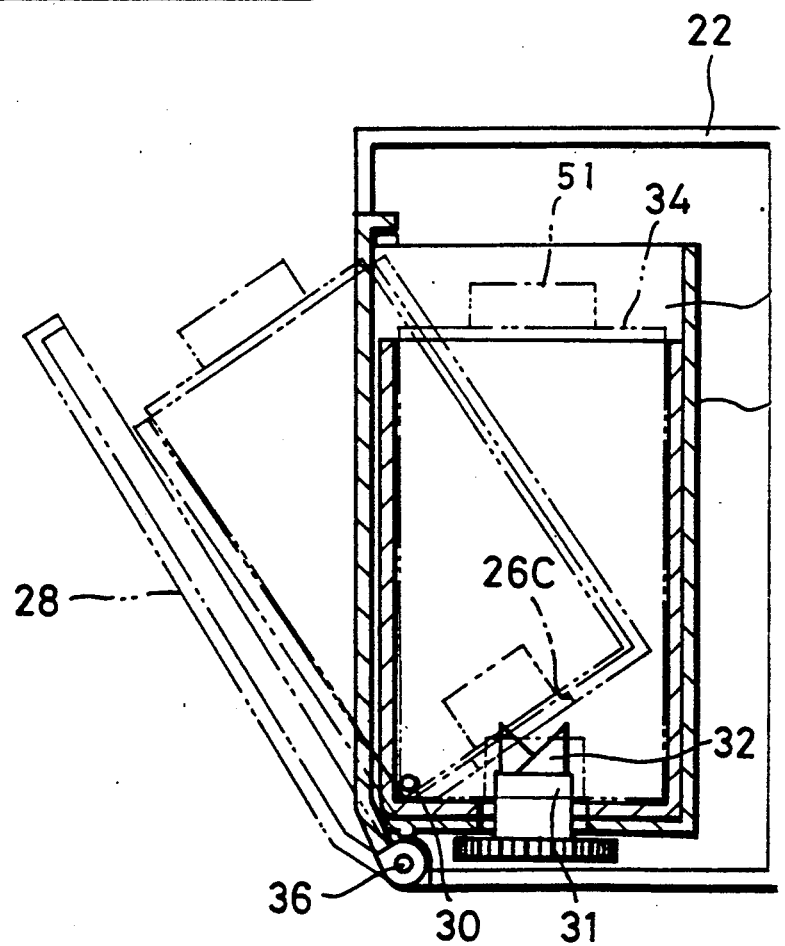
FIG. 4 is a sectional side elevation illustrating the film loading apparatus.
Figure 5:
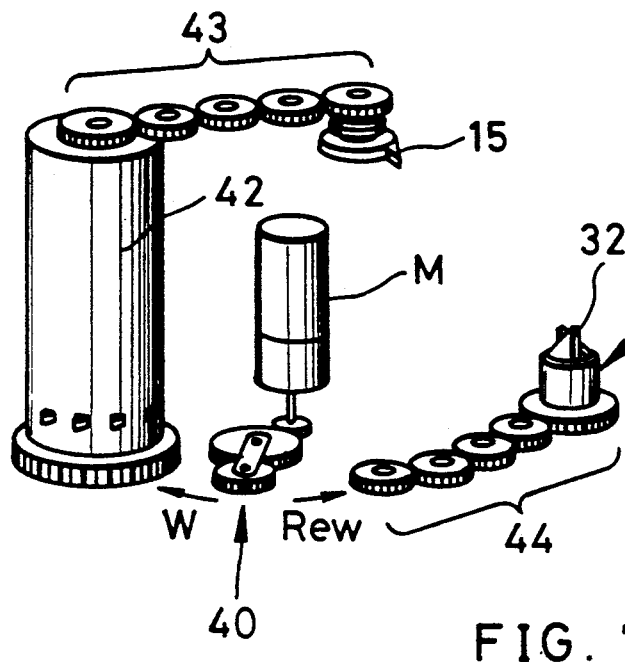
FIG. 5 is a schematic perspective view illustrating the film feeding mechanism.

As is illustrated in FIG. 4, the cassette holder 26 is swingable rearwardly of the camera about the shaft 30 in the film supply chamber 24. At the bottom of the film supply chamber 24, there is film rewinding shaft 31 which as a fork 32 and is rotated by a gear mechanism illustrated in FIG. 5. Specifically, the rotation of a motor M in the course of winding up the film is transmitted to a film take-up spool 42 by a planetary gear clutch 40, and further to the one-toothed rotary disk 15 by a gear train 43. On the other hand, when rewinding the film, the rotation of the motor M is transmitted to a gear train 44 by the planetary gear clutch 40 so as to rotate the film rewinding shaft 31. The arrow "W" indicates the film winding direction, and the arrow "Rew" the film rewinding direction.

Figure 6:
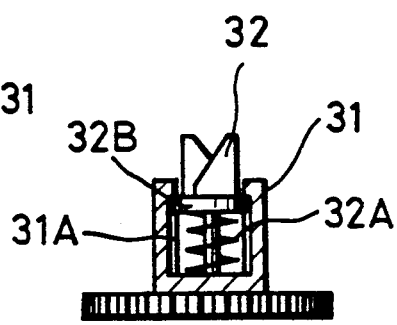
FIG. 6 is a sectional view illustrating the structure of the film rewinding shaft.

In FIG. 4, the lid 28 is shown to be swingably supported by the lid shaft 36 disposed horizontally along the rear side of the camera body 10 at its bottom. The lid 28 is provided with a stop (not shown) for restricting its rearward swinging. The bottom of the cassette holder 26 is provided with a hole 26C extending therethrough for guiding therein the fork 32 mounted on the camera body 22. As is illustrated in FIG. 6, a projection formed on a flange portion 32B of the fork 32 is shiftably fitted in a vertical groove 31A of the film rewinding shaft 31. The fork 32 is biassed upward by a spring 32A. The fork 32 is received within the lower end of a spool 51 of the film cassette 34 when the cassette holder 26 is disposed in its predetermined position in the film supply chamber 24.

Figure 7:
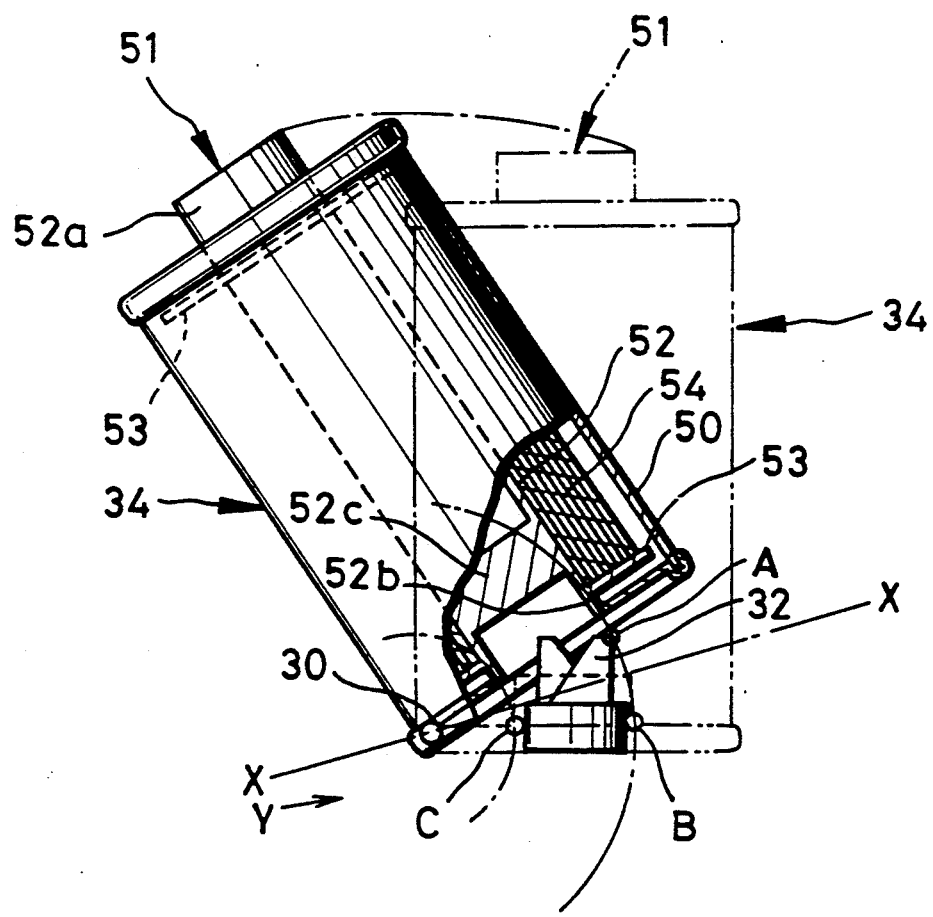
FIG. 7 is an explanatory view illustrating the positional relationship between a film cassette and the fork.

In FIG. 7, the film cassette 34 is seen to comprise a casing 50, the spool 51 rotatably housed in the casing 50, and the film 54 wound about the spool 51. The spool 51 has a spool shaft 52 and a pair of flanges 53. An upper end 52A of the spool shaft 52 projects from the casing 50, and a lower end 52B is coplanar with an end face of the casing 50. Near the lower end 52B, the spool shaft 52 has a partition plate 52C traversing its interior such that the fork 32 is adapted to engage with the partition plate 52C. To make smooth the engagement between the fork 32 and the partition plate 52C, the position of the rotary shaft 30 is as described below.

As is shown in FIG. 7, the center of gravity of the film cassette 34 is directly above shaft 30 when the lower edges of the cassette are parallel to the line X—X. This is the overcenter position of the cassette. The line X—X is also the bisector of an acute angel between lines connecting the shaft 30 with an outermost point A of the external diameter of the fork 32 on the one hand and with an outermost point B of the internal diameter of the lower end 52B of the spool 51 when the cassette is fully upright, on the other hand. The position of the shaft 30 is such that an innermost point C of the internal diameter of the lower end 52B is prevented from contacting the fork 32. Thus the fork 32 is smoothly fitted in the spool shaft 52 through the hole 26C at the bottom of the cassette holder 26 when the cassette holder 26 is contained in the film supply chamber 24. The specific position of the shaft 30 is determined in consideration of a simple construction for shielding light and other various circumstances. For example, the height of the camera can be reduced by placing the shaft 30 at a point shifted a substantial distance in the direction of the arrow Y.

The operation of the film loading apparatus for a camera in accordance with the present invention as constructed above will next be described. For loading the film 54 in the camera, the lid 28 is first opened to open the cassette holder 26, into which holder the film cassette 34 is then inserted. The film leader 21 is next inserted in the slot 26A. The cassette holder 26 is then pushed toward the camera body 22 to enclose the cassette holder 26 therein. The fork 32 passes through the hole 26C in the course of covering the film supply chamber 24 with the lid 28, and enters the lower end 52B of the spool 51 to engage with the partition plate 52C. Therefore it is unnecessary to utilize an interlocking mechanism of bevel gears such as those in the prior art illustrated in FIGS. 12 and 13, so that the drive mechanism having the film rewinding shaft 31 can be simplified in its construction, thereby to render compact the lower part of the camera.

Figure 8:
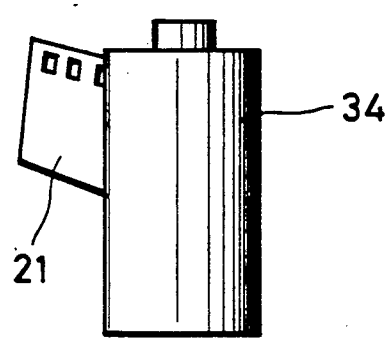
FIG. 8 is a front view illustrating a film cassette with the film leader upwardly inclined.
Figures 9A, 9B, 9C:
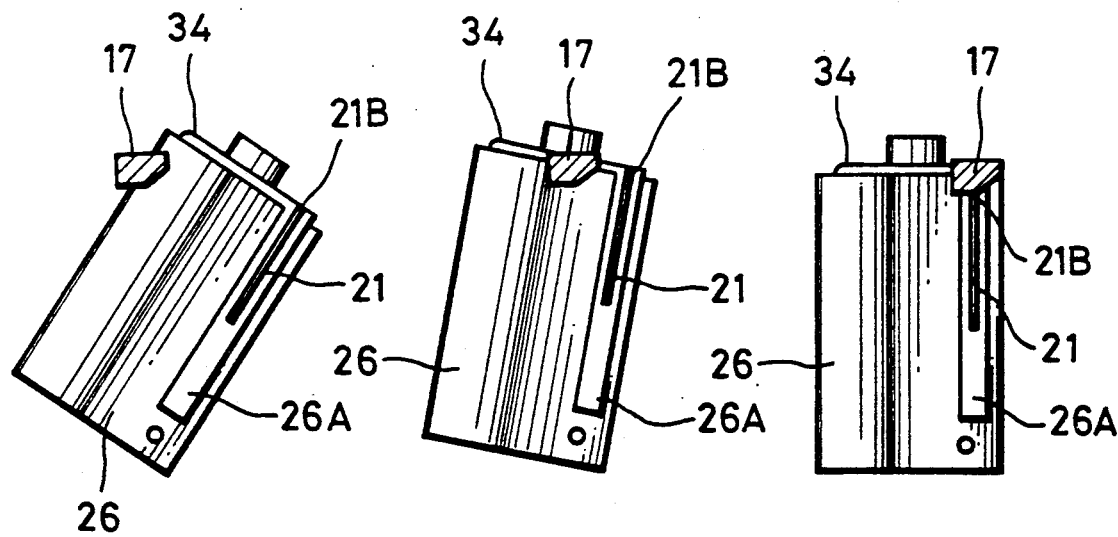
FIGS. 9A to 9C are explanatory views illustrating successive steps of loading the film whose film leader is upwardly inclined.

FIGS. 8 and 9A to 9C illustrate loading of the film 54 when the protruding film leader 21 is inclined upward. As the film leader 21 is upwardly inclined prior to loading, as illustrated in FIG. 8, the film upper edge positioning member 17 contacts the upper edge 21B of the film leader 21 to deflect it downward in the course of being received in the cassette holder 26 in the film supply chamber 24, as is illustrated in FIGS. 9A to 9C.

Figure 10:
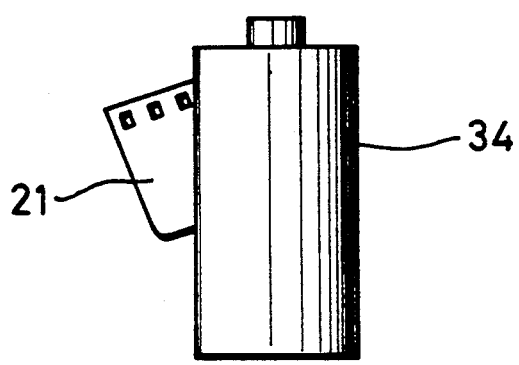
FIG. 10 is a front view illustrating a film cassette with the film leader downwardly inclined.
Figure 11:
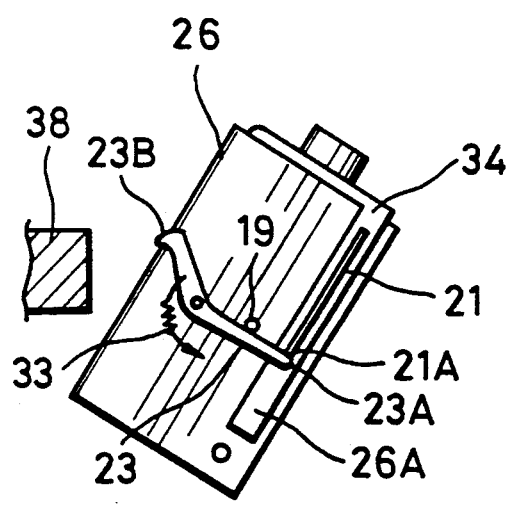
FIGS. 11A and 11B are explanatory views illustrating successive stages of loading the film whose film leader is downwardly inclined.
Figure 11:
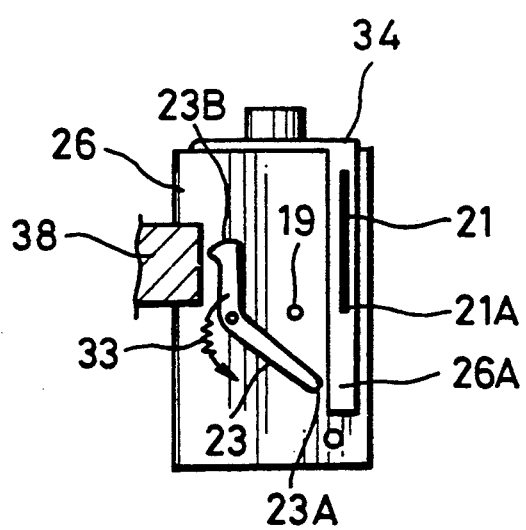

FIGS. 10, 11A and 11B illustrate loading of the film 54 when the protruding film leader 21 is inclined downward. When the film cassette 34 is inserted into the cassette holder 26, the lower edge 21A of the film leader 21 contacts the tip 23A of the film leader positioning member 23, which pushes leader 21 upward as is shown in FIG. 11A. When the cassette holder 26 is contained in the film supply chamber 24, and the film leader positioning member 23 comes into contact with the projection 38, member 29 is rotated clockwise against the biassing force of the spring 33 as shown in FIG. 11B, and in this way is retracted from the film passageway 13, and so is in a position to allow the film 54 to pass. The user has therefore no need to pay particular attention to the orientation of the film leader 21 when loading the film.

The fork 32 is allowed to shift downward by the spring 32A contained in the film rewinding shaft 31 even though the fork 32 is not fitted completely in the spool 51 when the film cassette is inserted. Thus the film cassette 34 can be inserted in the predetermined position in the cassette holder 26. The rotation of the spool 51 while unwinding the film 54 fits the partition plate 52C into the rising fork 32 with its flange portion 32B riding in the annular groove 31A.

Although the above embodiment uses a film of which the film leader 21 protrudes relatively little from the film passage mouth of the film cassette 34, it is also possible to use a conventional film with its film leader fully protruding. The present invention can also be applied to a film cassette of which the film leader 21 is wound completely inside the cassette and is fed to the film take-up chamber by rotation of the spool 51.

Although the present invention has been fully described by way of preferred embodiments thereof with reference to the accompanying drawings, various changes and modifications will be apparent to those having skill in this field. Therefore, unless otherwise these changes and modifications depart from the scope of the present invention, they should be construed as being inclined therein.

What is claimed is:

1. In a camera having a camera body, a film loading apparatus having a cassette holder for holding a film cassette therein, said cassette holder being movable between a first position wherein said cassette holder extends out of the camera body and a second position wherein said cassette holder is contained in a film supply chamber within said camera body, a cassette inlet of said cassette holder being exposed to insert said film cassette in an axial direction of said cassette when said cassette holder is in said first position, and a film rewinding shaft protruding into said film supply chamber in a direction perpendicular to a transporting direction of film drawn out of said film cassette; the improvement wherein said cassette holder swings relative to said film rewinding shaft upon movement between said first and second positions.

2. A film loading apparatus as defined in claim 1, wherein said cassette holder is rotatably relative to said film rewinding shaft around a first shaft disposed at the rear of said camera body in parallel with said film transporting direction, said cassette holder projecting obliquely from the rear of said camera body when said cassette holder is in said first position.

3. A film loading apparatus as defined in claim 2, further comprising:
a rear lid for closing said film supply chamber when said cassette holder is in said second position; and
a second shaft, disposed parallel to but spaced from said first shaft, about which said rear lid is swingable relative to said film rewinding shaft.

4. A film loading apparatus as defined in claim 3, wherein said first and second shafts are disposed in a lower portion of said camera body.

5. A film loading apparatus as defined in claim 1, in combination with a said film cassette, wherein said film rewinding shaft is disposed along a rotary locus of an end of said film cassette spool that is coplanar with a surface of said film cassette such that when said spool is swung about said first shaft relative to said film rewinding shaft, so as to fit said spool end onto said film rewinding shaft, a tip of said film rewinding shaft enters said spool end as said film cassette moves from said first toward said second position.

6. A film loading apparatus as defined in claim 1, wherein said film rewinding shaft has a free end having a fork thereon, means mounting said fork for movement in the axial direction of said film rewinding shaft, and spring means biassing said fork in a direction into said film supply chamber.

7. A film loading apparatus as defined in claim 1, further comprising means for biassing said cassette holder toward said first position.

8. A film loading apparatus as defined in claim 1, further comprising means for positioning correctly along a film passageway a film leader protruding from a said film cassette.

9. A film loading apparatus as defined in claim 8, wherein said positioning means is mounted on said cassette holder and contacts a lower edge of said film leader when said cassette holder is in said first position, and is retracted from said film passageway when said cassette holder is in said second position.

10. A film loading apparatus as defined in claim 8, wherein said positioning means is formed on said camera body and guides an upper edge of said film leader when said cassette holder is moved to said second position relative to said film rewinding shaft so as to position said film leader correctly along said film passageway.

* * * * *